(12) United States Patent
Shirakawa

(10) Patent No.: US 7,580,066 B2
(45) Date of Patent: Aug. 25, 2009

(54) DIGITAL CAMERA AND TEMPLATE DATA STRUCTURE

(75) Inventor: Masanobu Shirakawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 659 days.

(21) Appl. No.: 10/900,402

(22) Filed: Jul. 28, 2004

(65) Prior Publication Data
US 2005/0206747 A1    Sep. 22, 2005

(30) Foreign Application Priority Data
Jul. 29, 2003    (JP)    ............ P2003-202937

(51) Int. Cl.
*H04N 5/262*    (2006.01)
(52) U.S. Cl. ............. 348/239; 348/231.6; 348/345; 348/362; 348/207.2
(58) Field of Classification Search ......... 348/239, 348/231.6, 231.99, 231.3, 222.1, 345, 362
See application file for complete search history.

(56) References Cited

U.S. PATENT DOCUMENTS

| | | | | |
|---|---|---|---|---|
| 5,126,847 A | * | 6/1992 | Kori et al. | 348/239 |
| 5,477,264 A | * | 12/1995 | Sarbadhikari et al. | 348/231.6 |
| 5,519,202 A | * | 5/1996 | Kusaka | 250/201.8 |
| 6,606,117 B1 | * | 8/2003 | Windle | 348/239 |
| 7,221,395 B2 | * | 5/2007 | Kinjo | 348/239 |
| 2002/0080251 A1 | * | 6/2002 | Moriwaki | 348/232 |
| 2002/0171746 A1 | * | 11/2002 | Stephany et al. | 348/239 |
| 2004/0100572 A1 | * | 5/2004 | Kim | 348/333.01 |
| 2004/0169741 A1 | * | 9/2004 | Hayashi | 348/231.3 |
| 2005/0007468 A1 | * | 1/2005 | Stavely et al. | 348/239 |

FOREIGN PATENT DOCUMENTS

JP    11-168689 A    6/1999

* cited by examiner

*Primary Examiner*—Jason Chan
*Assistant Examiner*—Cynthia Calderon
(74) *Attorney, Agent, or Firm*—Sughrue Mion, PLLC

(57) ABSTRACT

A digital camera includes: an imaging unit that images a subject; a storage that stores preset-image data indicative of a preset image having an insertion area for a user image, and imaging control data for controlling an imaging of a user image which is to be inserted into the insertion area, with associating the preset-image data with the imaging control data; a controller that controls the imaging unit based on the imaging control data; and an outputting unit that outputs user image data indicative of the user image output from the imaging unit, with associating the user image data with the preset-image data.

1 Claim, 6 Drawing Sheets

FIG. 1 (A)

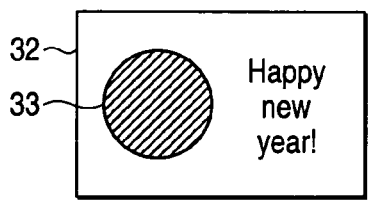

TITLE: NEW YEAR'S CARD
RANGE-FINDING AREA: LEFT
PHOTOMETRIC AREA: LEFT
IMAGING MODE: PORTRAIT

FIG. 1 (B)

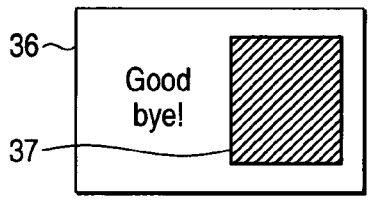

TITLE: GRADUATION CEREMONY
RANGE-FINDING AREA: RIGHT
PHOTOMETRIC AREA: RIGHT
DIAPHRAGM CORRECTION: -2
COLOR TONE: SEPPIA

FIG. 1 (C)

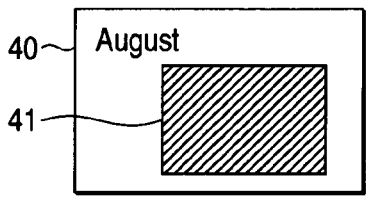

TITLE: CALENDAR
RANGE-FINDING AREA: LOWER RIGHT
PHOTOMETRIC AREA: LOWER RIGHT
IMAGING MODE: LANDSCAPE
COLOR TONE: BRIGHT

FIG. 1 (D)

TITLE: TRAVEL
DIAPHRAGM CORRECTION: +2

FIG. 1 (E)

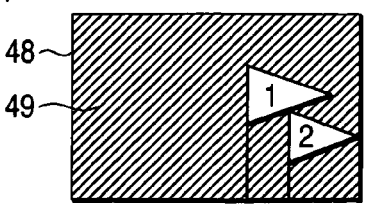

TITLE: ATHLETIC MEETING
RANGE-FINDING AREA: LEFT
PHOTOMETRIC AREA: LEFT
WHITE BALANCE: OUTDOOR
SHUTTER SPEED: HIGH

DIGITAL CAMERA AND TEMPLATE DATA STRUCTURE

BACKGROUND OF THE INVENTION

The present invention relates to a digital camera and a template data structure.

Conventionally, a template for forming a composite image in which an arbitrary image (user image) selected by the user is used has been known. A template is configured by data such as data indicative of a preset image serving as a background of a user image or a decorative frame, and those indicative of an area into which the user image is to be inserted. A user image which is to be inserted into a template is taken by, for example, a digital camera or an image scanner. Patent Reference 1 discloses a method in which, in an imaging mode of a digital camera, a preset image of a template and a subject image are compositely displayed on an electronic view finder, thereby facilitating framing to be conducted in accordance with the template.

There is a template in which the layout is defined so that an area which is shifted from the center of a user image is partially inserted or a preset image is superimposed on a center portion of a user image. In the case where a user image which is to be inserted into such a template is taken by a digital camera, framing is conducted so that a center portion of a subject is positioned in an area which is shifted from a center portion of an electronic view finder. When a subject on which framing is conducted in this way is to be imaged in an auto-focus mode, it is preferable to image the subject with focusing not on the center of the imaging range but on a center portion of the subject.

Patent Reference 1:
    JP-A-11-168689

In an auto-focus mode of a digital camera, usually, the distance to a center area of the imaging range is measured, and the focus is set on the area. In order to focus on a portion shifted from the center of the imaging range, therefore, it is usually required to perform operations of locking the focus in a state where framing is conducted so that a center portion of a subject is located at the center of the imaging range, and then conducting again framing so that the center portion of the subject is moved to a position corresponding to a preset image of a template. For a user who is unaccustomed to operate the camera, however, it is usually difficult to perform such operations.

SUMMARY OF THE INVENTION

The invention has been conducted in order to solve the problem. It is an object of the invention to provide a digital camera and a template data structure which enable a user image suitable to a template to be easily taken.

In order to attain the object, the digital camera of the invention is characterized in that the digital camera comprises: an imaging unit for imaging a subject; a storage for storing preset-image data indicative of a preset image having an insertion area for a user image, and imaging control data for controlling an imaging of a user image which is to be inserted into the insertion area, with associating the data with each other; a controller for controlling the imaging unit based on the imaging control data; and an outputting unit for outputting user image data indicative of a user image output from the imaging unit, with associating the user image data with the preset-image data. Before imaging, a preset image indicative of a preset image having an insertion area for a user image, and information for controlling an imaging of a user image which is to be inserted into the insertion area are previously stored into the digital camera with being associated with each other. When a user image to be inserted into the template is taken, the imaging unit is controlled on the basis of the previously stored information for controlling imaging. Therefore, a user image suitable to a template can be easily imaged by the digital camera. In the specification, a process of imaging a subject to produce a user image indicative of the subject is referred to as "an imaging of a user image".

The digital camera of the invention is further characterized in that the controller controls an auto-focus area in an imaging range of the imaging unit based on the imaging control data. Information for controlling the auto-focus area in the imaging range is previously stored into the digital camera, and imaging is controlled with using the information. Even when an area which is shifted from the center of a user image corresponds to an important area to be combined with a preset image of a template, therefore, the distance to an area in the imaging range corresponding to an important area of the user image to be combined with the preset image of the template can be measured, and the subject can be easily imaged with focusing on the area.

The digital camera of the invention is further characterized in that the controller controls a photometric area in an imaging range of the imaging unit based on the imaging control data. Information for controlling the photometric area in the imaging range is previously stored into the digital camera, and imaging is controlled with using the information. Even when an area which is shifted from the center of a user image corresponds to an important area to be combined with a preset image of a template, therefore, the subject can be easily imaged with setting an exposure matched to the area in the imaging range corresponding to the important area of the user image to be combined with the preset image of the template.

The digital camera of the invention is further characterized in that the controller controls an exposure of the imaging unit based on the imaging control data. Information for setting an exposure suitable to the theme and use of a template is previously stored into the digital camera, and an exposure is controlled with using the information. Therefore, a subject can be easily imaged with setting an exposure suitable to the theme and use of the template.

The digital camera of the invention is further characterized in that the controller controls a diaphragm of the imaging unit based on the imaging control data. Information for setting a diaphragm suitable to the theme and use of a template is previously stored into the digital camera, and a diaphragm is controlled with using the information. Therefore, a subject can be easily imaged with setting a diaphragm suitable to the theme and use of the template.

The digital camera of the invention is further characterized in that the controller controls an exposure period of the imaging unit based on the imaging control data. Information for setting an exposure period suitable to the theme and use of a template is previously stored into the digital camera, and an exposure period is controlled with using the information. Therefore, a subject can be easily imaged with setting an exposure period suitable to the theme and use of the template.

In order to attain the object, the template data structure of the invention is characterized in that the template data structure includes: a preset-image area into which preset-image data indicative of a preset image having an insertion area for a user image are to be stored; and an imaging control area into which imaging control data for controlling an imaging of a user image which is to be inserted into the insertion area are to be stored. Information for controlling an imaging of a user image to be inserted into the insertion area is included in template data, whereby a user image suitable to a template can be easily taken.

The template data structure of the invention is characterized in that the imaging control data control imaging conditions of a digital camera which takes a user image which is to be inserted into the insertion area. Information for controlling imaging conditions of a digital camera which takes a user image which is to be inserted into the insertion area is included in template data. Therefore, a user image suitable to a template can be easily taken by the digital camera.

The template data structure of the invention is further characterized in that the imaging control data control an auto-focus area in an imaging range of the digital camera. Information for controlling the auto-focus area in the imaging range of the digital camera is included in template data. Even when an area which is shifted from the center of a user image corresponds to an important area to be combined with a preset image of a template, therefore, the subject can be easily imaged with focusing on an area in the imaging range corresponding to an important area of the user image to be combined with the preset image of the template.

The template data structure of the invention is further characterized in that the imaging control data control a photometric area in an imaging range of the digital camera. Information for controlling the photometric area in the imaging range of the digital camera is included in template data. Even when an area which is shifted from the center of a user image corresponds to an important area to be combined with a preset image of a template, therefore, the subject can be easily imaged with setting an adequate exposure matched to the area in the imaging range corresponding to the important area of the user image to be combined with the preset image of the template.

The template data structure of the invention is further characterized in that the imaging control data control an exposure of the digital camera. Information for controlling the exposure of the digital camera is included in the template data. Therefore, a subject can be easily imaged with setting an exposure suitable to the theme and use of the template. In the case of a template which is assumed to have use of displaying a photographic image of a certain person with a decorative frame, when the area of the person is sharp and that other than the person is blurred, for example, a preferable composition result is often obtained. In such a case, a template is desired to include information for controlling a digital camera so as to conduct imaging in a diaphragm-priority automatic exposure mode in which a diaphragm can be set to a small degree.

The template data structure of the invention is further characterized in that the imaging control data control a diaphragm of the digital camera. Information for controlling a diaphragm of a digital camera is included in template data. Therefore, a subject can be easily imaged with setting a diaphragm suitable to the theme and use of a template.

The template data structure of the invention is further characterized in that the imaging control data control an exposure period of the digital camera. Information for controlling an exposure period of a digital camera is included in template data. Therefore, a subject can be easily imaged with setting an exposure period suitable to the theme and use of a template. In the case of a template for producing an electronic album in which images of sports scene are laid out, for example, a fast-moving subject is imaged to produce a clear user image, and hence a template preferably includes information for controlling the exposure period so as to be shortened.

BRIEF DESCRIPTION OF THE DRAWINGS

FIGS. 1A to 1E are diagrams illustrating templates in an embodiment.

FIG. 4A is a front view, and FIG. 4B is a rear view.

DETAILED DESCRIPTION OF THE PREFERRED EMBODIMENT

Hereinafter, an embodiment of the invention will be described by way of an embodiment.

Figure 2:
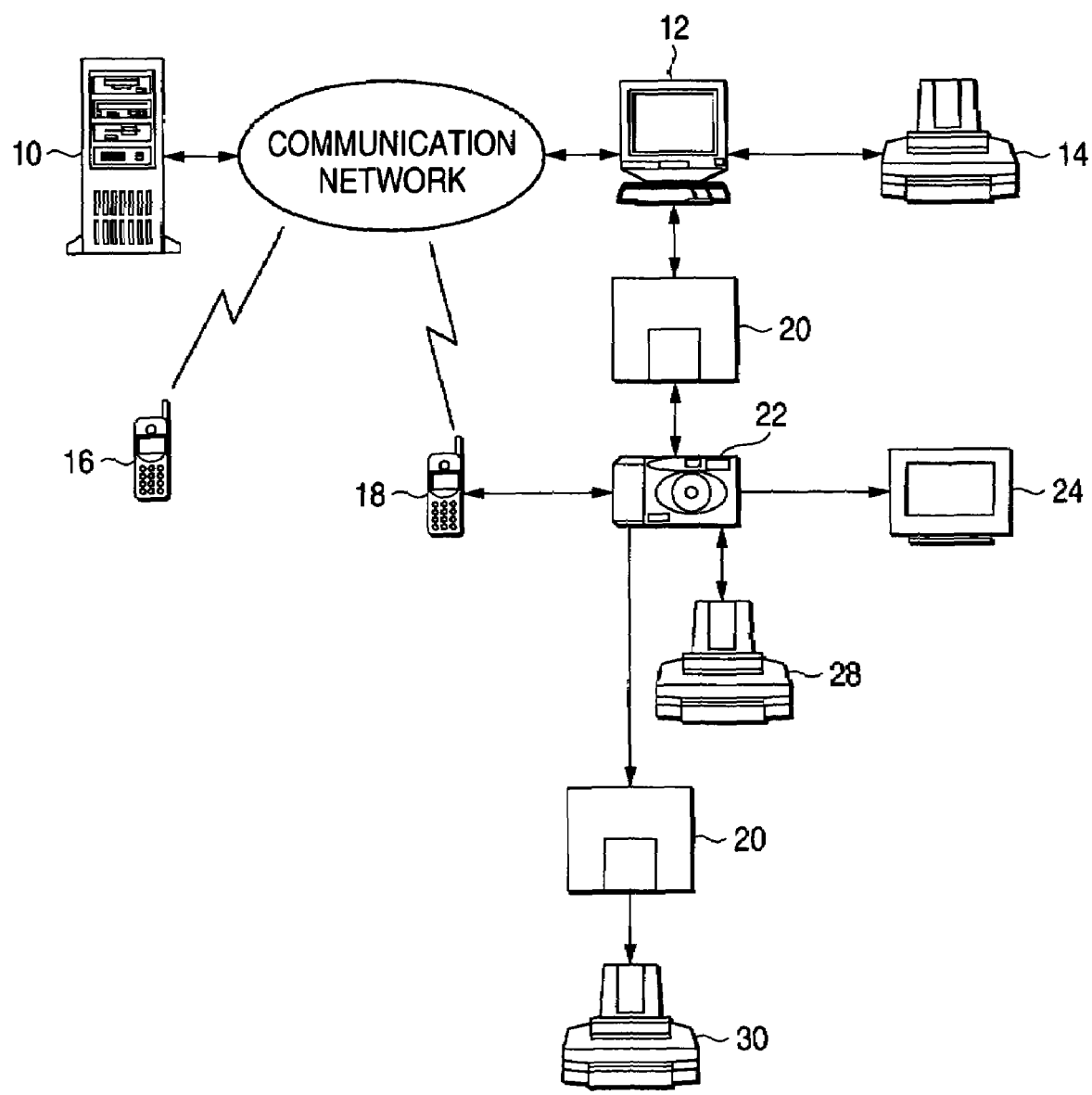
FIG. 2 is a diagram illustrating uses of the templates in the embodiment.

FIG. 2 is a diagram illustrating uses of templates in an embodiment of the invention.

A template is distributed to users through, for example, a communication network. Specifically, for example, a template stored in a server 10 is transmitted upon request of a user to a personal computer (PC) 12 or a personal digital assistance such as a portable telephone 18 which is connected to a communication network.

In a digital camera 22, image data (user image data) which are produced by imaging a subject are output with being associated with a template. Imaging conditions for producing user image data in the digital camera 22 are set on the basis of the template. The user image data which are output from the digital camera 22 with being associated with a template is printed with being inserted into the template by a printer 28 which is directly connected to the digital camera 22, or a printer 30 which acquires data from the digital camera 22 through a removable memory 20, displayed with being inserted into the template by a television monitor 24 which is directly connected to the digital camera 22, or displayed with being inserted into the template by a portable telephone 16 to which the template and a user image are transferred from the digital camera 22 through the communication network.

A template can be input to the digital camera 22 by, for example, a method in which the PC 12 reads the template stored in the removable memory 20, into the digital camera, or that in which the digital camera 22 is directly connected to the PC 12 or the portable telephone 18 through a wireless communication interface or a wired communication interface.

FIGS. 1A to 1E are diagrams illustrating templates in one embodiment of the invention. The templates are page layouts which are previously produced so as to be displayed while a user image is inserted thereinto. Each of the templates is configured by, for example, data indicative of: an image (preset image) 32, 36, 40, 44, 48 which is previously produced and to be combined with a user image; an area (insertion area) 33, 37, 41, 45, 49 into which a user image is to be inserted; and information (imaging control information) 34, 38, 42, 46, 50 for controlling an imaging of a user image. In FIGS. 1A to 1E, the insertion area is shown as a hatched area.

The preset image 32, 36, 40, 44, 48 may be indicated by raster data, or by vector data. The insertion area 33, 37, 41, 45,

49 may be defined by coordinates, by a so-called a channel which defines the transmittance of each pixel, or by a combination of coordinates and an α channel. When the α channel is used, it is possible to define an insertion area of an arbitrary shape other than a rectangle. In the embodiment, for a page which is determined in accordance with the size of a printing sheet, placements of a preset image and a user image are defined by coordinates, and a preset image is indicated by image data having channels of RGB and an α channel, thereby indicating a preset image having a transparent area corresponding to an insertion area. In the embodiment, placements of a preset image and a user image are conformed to each other to cause the outer edges of the images to coincide with each other. Alternatively, it is not required to cause the outer edges of a preset image and a user image to coincide with each other. In the embodiment, a preset image having an insertion area is indicated by image data of one file including channels of RGB and an a channel. Alternatively, three channels of RGB, and an a channel may be separated in two files.

The imaging control information 34, 38, 42, 46, 50 is described in a script language in a layout control file which will be described later. The imaging control information can include information for controlling an arbitrary process which is implemented to image a subject by the digital camera 22, and record image data (a user image file) indicative of the subject onto a nonvolatile recording medium. Specifically, information for controlling, for example, the range-finding area, the photometric area, the imaging mode (a panorama mode, a macro mode, a night scene mode, a portrait mode, a landscape mode, a sports mode, and the like), the diaphragm correction, the color tone, the white balance, the shutter speed, the compression ratio, and the image size can be included in a template as the imaging control information. Hereinafter, templates for specific uses will be described.

The template shown in FIG. 1A is a template for printing and displaying a New Year's card into which a user image that is a portrait photograph is inserted. Since the preset image 32 and the user image are placed on a page so that the outer edges of the images coincide with each other as described above, a circular area of the user image which is shifted toward the left side from the center of the user image is inserted into the insertion area 33. Therefore, an important area of the user image is not a center portion, but an area which is shifted toward the left side from the center. When an image which is to be inserted into the template shown in FIG. 1A is taken, preferably, framing is conducted so that a main portion such as the face of the subject is located in an area which is shifted toward the left side from the center of the imaging range, the focus is set on the left side with respect to the center of the imaging range, and the exposure is set in accordance with the light quantity of the left side with respect to the center of the imaging range. In the template shown in FIG. 1A, therefore, the range-finding area for auto-focusing is set to "Left", the photometric area for automatic exposure setting to "Left", and the imaging mode to "Portrait". The range-finding area and the photometric area can be set to any one of center, left, right, upper, and lower areas which are obtained by dividing the imaging range into five areas. Of course, the manner of setting the range-finding area and the photometric area is not restricted to this. In the digital camera 22, when the imaging mode is set to "Portrait", values suitable to portrait photography in each type of the digital camera 22 are set as various parameters constituting the imaging conditions.

The template shown in FIG. 1B is a template for screen displaying an electronic album into which user images that are snapshots in a graduation ceremony are inserted. A rectangular area of a user image which is shifted toward the right side from the center of the user image is inserted into the insertion area 37. Therefore, an important area of the user image is an area which is shifted to the right side from the center. In the template shown in FIG. 1B, consequently, the range-finding area and the photometric area are set to "Right". In the template shown in FIG. 1B, in order to represent the atmosphere of a graduation ceremony, the color tone is set to "Sepia". In the digital camera 22, when the color tone is set to "Sepia", a color converting process of lowering the chroma is implemented during an imaging process, and image data indicative a sepia-toned user image are recorded onto a nonvolatile recording medium.

The template shown in FIG. 1C is a template for printing and displaying a calendar of August into which a user image that is a photograph taken in summer is inserted. In the template shown in FIG. 1C, in order to represent the atmosphere of summer, the color tone is set to "Bright". In the digital camera 22, when the color tone is set to "Bright", a color converting process of raising the chroma is implemented during an imaging process, and image data indicative a user image of bright colors are recorded onto a nonvolatile recording medium.

The template shown in FIG. 1D is a template for printing and displaying a postcard into which a user image that is a photograph taken during a travel is inserted. In the template shown in FIG. 1D, in order to enable a user image clearly showing both a person and a landscape in a travel destination that is in the background of the person to be inserted, the diaphragm correction is set to "+2", and the digital camera 22 is controlled so as to open the diaphragm to a degree which is higher than that of the default of automatic exposure.

The template shown in FIG. 1E is a template for screen displaying an electronic album into which user images that are taken in an athletic meeting, and that show a moving subject. In the template shown in FIG. 1E, in order to enable a user image showing a fast-moving subject who is running or dancing in an athletic meeting in the open air, to be taken naturally and clearly, the white balance is set to "Outdoor", and the shutter speed to "High". In the digital camera 22, when the white balance is set to "Outdoor", a color converting process is implemented so that the hue of a subject who is imaged under sunlight is felt by a person without causing a sense of discomfort. When the shutter speed is set to "High" in the digital camera 22, the diaphragm is set in a shutter speed-priority automatic exposure mode.

Figure 3:
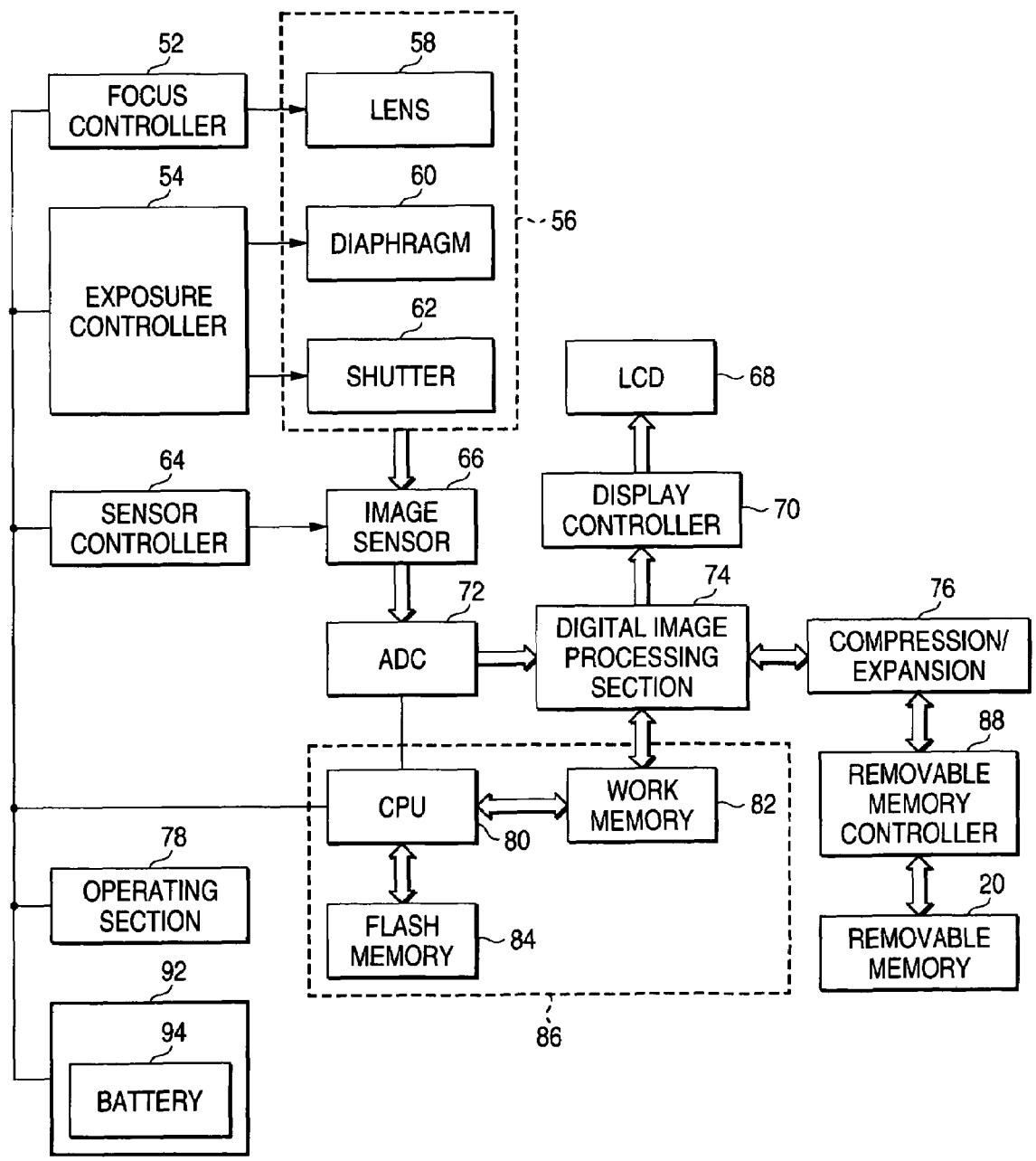
FIG. 3 is a block diagram showing a digital camera of the embodiment.
Figure 4:
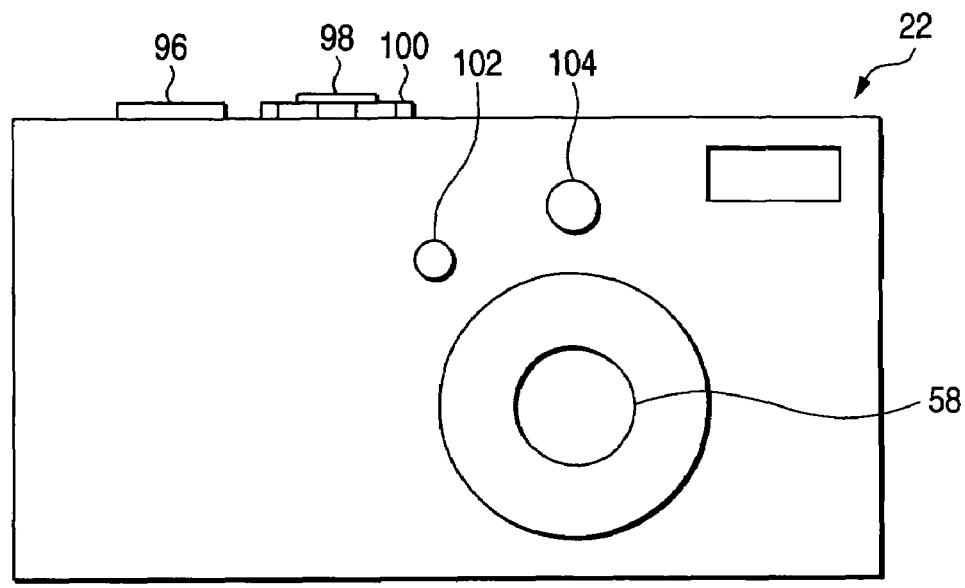
FIGS. 4A and 4B are views showing an appearance of the digital camera of the embodiment.
Figure 4:
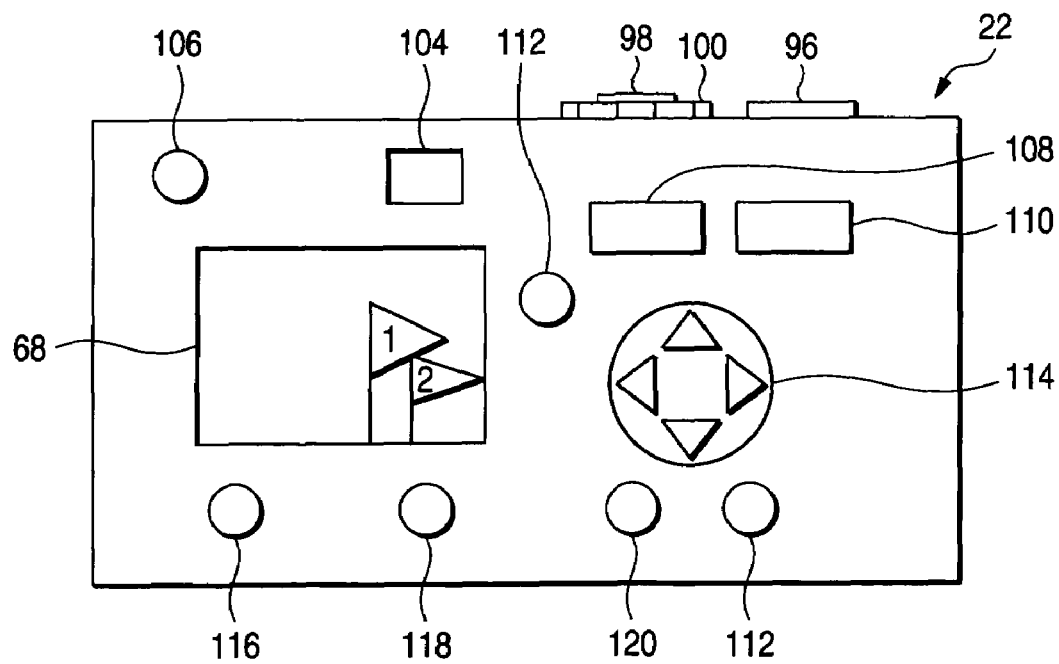

FIG. 3 is a block diagram showing the digital camera 22 of the embodiment. FIG. 4 is a view showing an appearance of the digital camera 22 of the embodiment, FIG. 4A is a front view, and FIG. 4B is a rear view.

An optical system 56 serving as an imaging unit is configured by a lens 58, a diaphragm 60, a shutter 62, etc.

The lens 58 is driven by a focus controller 52. The focus controller 52 moves the lens 58 in the optical axis direction so that a clear optical image of a subject is formed on a light-receiving surface of an image sensor 66. In the focus controller 52, the range-finding system may be of the active type or the passive type, the TTL (Through the Lens) type or the point eye type, or the contrast-detection type or the phase detection type. The range-finding area of the focus controller can be set to any one of the center, left, right, upper, and lower areas which are obtained by dividing the imaging range into five areas. The embodiment comprises an optical finder 104 (see FIGS. 4A and 4B). Alternatively, the embodiment may have a so-called single-lens reflex optical system.

The diaphragm 60 and the shutter 62 are driven by an exposure controller 54. The exposure controller 54 comprises a light control sensor 102 (see FIG. 4), and controls the opening area of the diaphragm 60 and the opening period of the shutter 62 so as to allow an adequate quantity of light to be incident on the light-receiving surface of the image sensor 66. The photometering system of the exposure controller 54 is compatible with both digital ESP metering and spot metering. When the photometric area is set in accordance with a template, photometering is conducted on the designated photometric area by the spot metering method, and an adequate exposure is determined. In the spot metering method, the photometric area can be set to any one of the center, left, right, upper, and lower areas which are obtained by dividing the imaging range into five areas. In the embodiment, the exposure period is controlled by the mechanical shutter 62. Alternatively, the exposure period may be controlled by electrically adjusting the charge accumulating time of the image sensor 66 by a sensor controller 64.

The image sensor 66 is an area image sensor comprising: pixels which are discretely arranged in a two-dimensional space; and a charge transfer device such as a CCD (Charge Coupled Device). The image sensor 66 is driven by the sensor controller 64. In the image sensor 66, for each of the pixels, charges which are obtained by photoelectric conversion of an optical image formed on the light-receiving surface by the optical system 56 are accumulated for a constant time period, and an electric signal corresponding to the received light quantity of each pixel is output. A color image can be taken by disposing complementary filters for four colors or C (Cyan), M (Magenta), Y (Yellow), and G (Green), or primary color filters for R (Red), G (Green), and B (Blue) on the light-receiving surface.

An A/D converting section (ADC) 72 quantizes the analog electric signal output from the image sensor 66 to convert the signal into a digital signal. Specifically, the ADC 72 performs processes such as a process of reducing noises contained in the electric signal, that of adjusting the level of the electric signal by a gain adjustment, and a quantization process.

A digital image processing section 74 applies an image forming process, white balance correction, γ correction, other color conversions, and the like on the digital signal output from the ADC 72, and, for each pixel, produces digital image data indicative of gray scale values of R, G, and B and those of Y, Cb, and Cr. The image forming process is a process of interpolating brightness information of one color corresponding to each pixel of the image sensor 66 with that of other colors of neighborhood pixels, thereby outputting digital image data having three gray scale values of R, G, and B for each pixel. The white balance correction is a process of performing correction so as to allow a white subject to appear white irrespective of the kind of the light source. In a digital camera, although an image of a white subject which is taken under sunlight appears white, usually, an image of the subject which is taken in doors under incandescent lighting appears reddish. Therefore, the white balance correction is conducted to correct data so that also a digital image of the white subject appears white. The manner of correction of the white balance depends on the light source. In the digital camera 22, therefore, the user selects one of items, or "Outdoor", "Fluorescent", and "Incandescent" in order to specify the kind of the light source, and correction conforming to the selected item is conducted. Examples of color converting processes other than the white balance correction and the γ correction are a process of raising the chroma to form a bright image, and that of lowering the chroma to form a sepia-toned image.

A compression/expansion section 76 compresses image data produced by the digital image processing section 74, and expands image data which are compressed and stored into the removable memory 20. In the compression/expansion section 76, the format of compressed data may be any one of JPEG format, RAW format, and TIFF format. The data format and the compression ratio are selectable.

A removable memory controller 88 serving as a storage writes data into the removable memory 20 serving as a storage, and reads data stored in the removable memory 20.

A controlling section 86 serving as a controller comprises a CPU 80, a flash memory 84, and a work memory 82. The CPU 80 executes computer programs stored in the flash memory 84 to control the whole digital camera 22. The flash memory 84 is a nonvolatile internal memory which stores various programs and data, etc. The various programs and data which are to be stored into the flash memory 84 may be downloaded from a predetermined server through a network and then stored into the memory, or read out from a computer-readable recording medium such as the removable memory 20 and then stored into the memory. The work memory 82 is a volatile internal memory for temporarily storing programs and data.

An LCD 68 is controlled by a display controller 70, and displays a digital image and various setting menus.

The display controller 70 comprises a frame buffer for storing data of one frame of the LCD 68, and a display circuit for driving the LCD 68 based on the data stored in the frame buffer.

An operating section 78 comprises plural switches for inputting instructions from the user into the controlling section 86, and an interface circuit. The switches of the operating section 78 include: a power button 98; a shutter button 96; a mode dial 100 for switching over the imaging mode and a reproducing mode; a print button 106 for instructing a start of printing in a state where the digital camera 22 is directly connected to the printer 28 (see FIG. 2); a menu button 112 for displaying a menu on the screen; a zoom-in button 110; a zoom-out button 108; a multiselector 114 configured by a cross key for operating a menu; a macro button 116 for setting imaging conditions for macro photography; a flash button 118 for flash photography; a display button 120 for turning on the LCD 68; and a simple-reproduction button 122 for screen displaying image data stored in the removable memory 20.

A power source section 92 comprises a battery 94, and a control circuit, and is electrically connected to the above-mentioned various portions. The battery 94 supplies an electric power to the portions.

Figure 5:
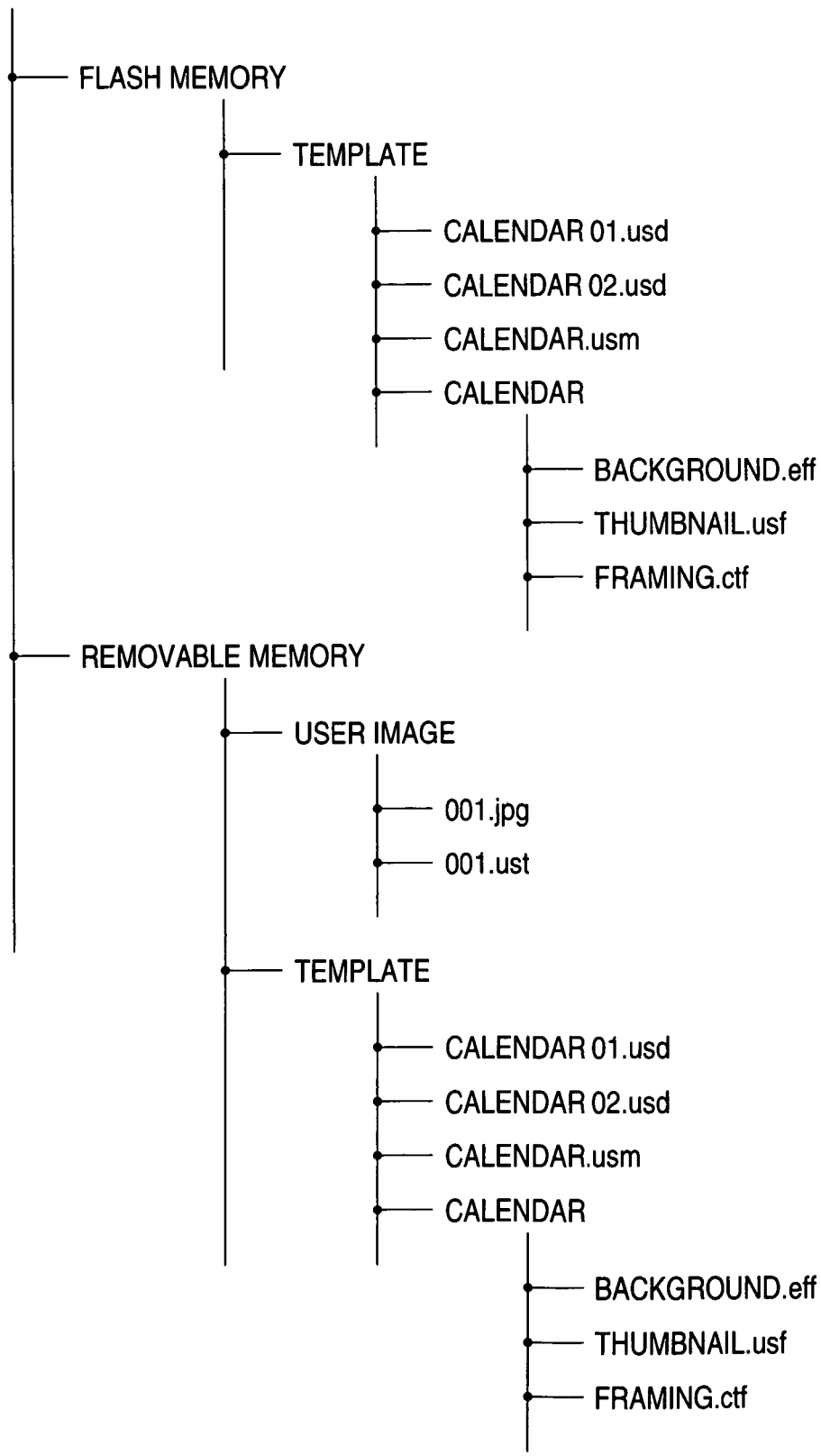
FIG. 5 is a view showing directories of the digital camera of the embodiment.

FIG. 5 is a view showing directories of the digital camera 22 of the embodiment. Templates which are input before imaging are stored in a specific directory (in the illustrated example, "Template") of the flash memory 84. Each of the templates is configured by plural files which are described below.

In a layout control file having extension "usd", the size of a printing sheet, placements of a preset image and a user image, the path of a file indicating the preset image, and imaging control information are described in a script language. The imaging control information described in a script language corresponds to imaging control data. Templates of the same design may be defined by a layout control file for each printing sheet size. In the example shown in FIG. 5, templates of the same design specified by title "Calendar" are indicated by two layout control files "Calendar01.usd" and "Calendar02.usd".

In an index file having extension "usm", information associating plural files constituting a template of one design with each other is described. For example, information which associates each printing sheet size with the path of a layout control file is described.

In a preset-image file having extension "eff", data indicative a preset image are stored. As described above, in a preset-image file, a preset image having an insertion area for a user image is indicated by a total of four channels or RGB channels and an α channel.

In a thumbnail file having extension "usf", image data for screen displaying the design of a template are stored.

In a framing auxiliary image file having extension "ctf", image data for screen displaying on the LCD 68 a framing auxiliary image in which the whole or a part of a preset image is monochromatically displayed. In the imaging mode, a framing auxiliary image is displayed on the LCD 68, and a subject is displayed as a motion picture in a layer lower than the framing auxiliary image. Therefore, a framing process can be easily applied to a subject so that, when a user image is inserted into a template, an important portion of the subject is not hidden by a preset image.

Figure 6:
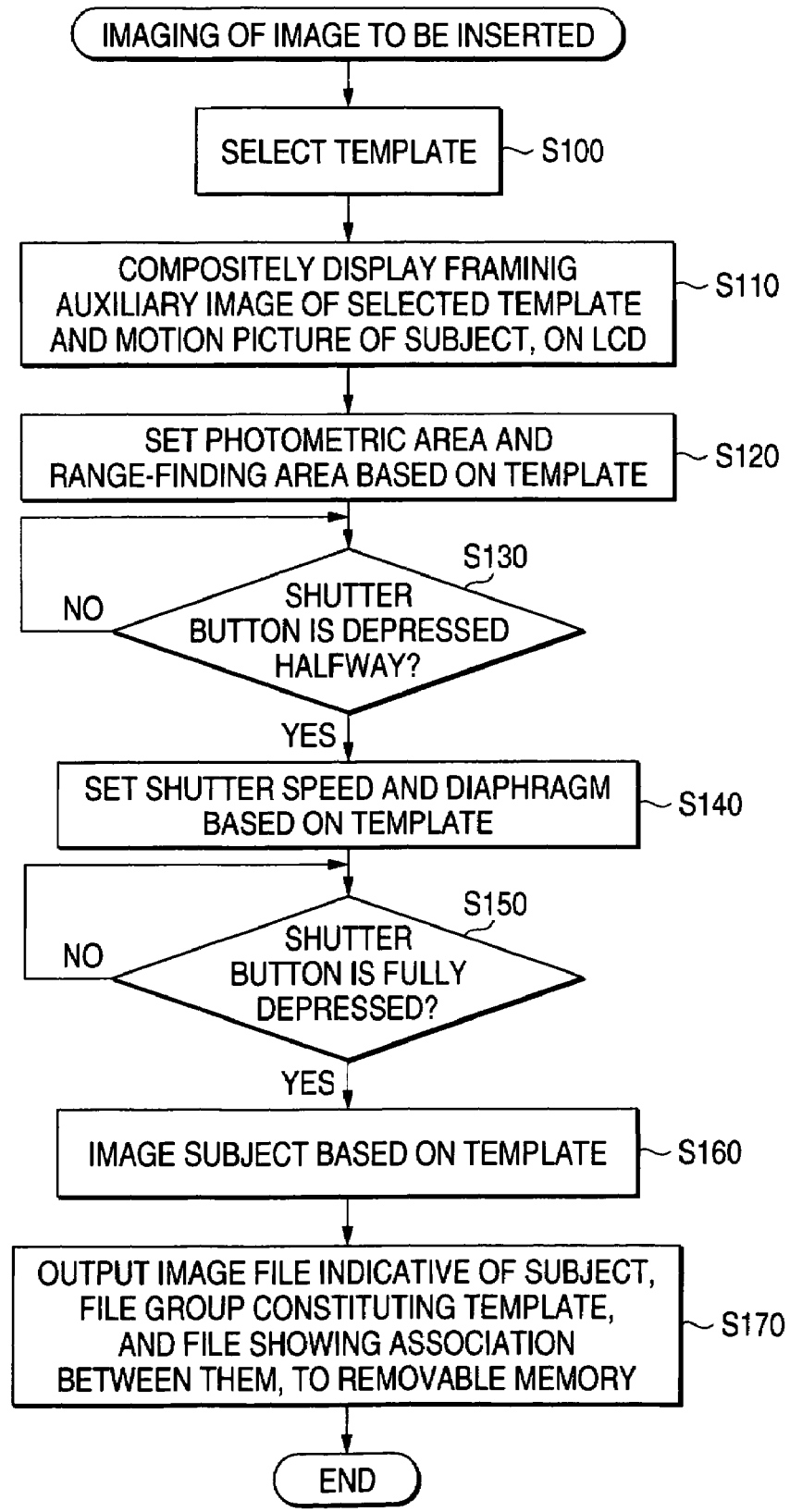
FIG. 6 is a flowchart showing the flow of a process in the embodiment.

FIG. 6 is a flowchart showing the flow of a process of producing a user image to be inserted into a template and recording it into the removable memory 20 in the digital camera 22 of the embodiment.

First, the user selects a template which is previously stored in the flash memory 84 (S100). Specifically, a thumbnail file of templates which are previously stored in the flash memory 84 is displayed on the LCD 68, thereby allowing the user to select a desired one of the templates which are displayed in the thumbnail file.

Next, on the basis of framing auxiliary image data of the selected template and image data output from the digital image processing section 74, a framing auxiliary image and a motion picture of a subject are displayed on the LCD 68 (S110).

Next, based on the imaging control information described in the layout control file of the template, the photometric area for automatic exposure setting and the range-finding area for auto-focusing setting are set (S120).

Next, the process waits until the shutter button 96 is depressed halfway (S130).

When the shutter button 96 is depressed to an intermediate position, the shutter speed and the diaphragm are set based on the imaging control information described in the layout control file of the selected template (S140). Specifically, in the case of the template shown in FIG. 1E, for example, range-finding and photometry are conducted on an area which is shifted toward the left side from the center of the imaging range, an adequate diaphragm suitable to a high shutter speed range is calculated based on results of the measurements, and the adequate diaphragm obtained as a result of the calculation and the high shutter speed are set. In the case of the template shown in FIG. 1D, for example, the diaphragm is set to "+2" with respect to a standard diaphragm which is calculated from the result of the photometry, so as to increase the opening area of the diaphragm 60 to be larger than the standard diaphragm, and a shutter speed suitable to the diaphragm is calculated and then set. In the case of the template shown in FIG. 1A, for example, the exposure conditions suitable to the imaging mode of "Portrait" are calculated on the basis of the measurement results, and then set.

Next, the process waits until the shutter button 96 is fully depressed (S150).

When the shutter button 96 is fully depressed, the subject is imaged on the basis of the imaging control information described in the layout control file of the selected template, and image data indicative of the subject are produced (S160). Specifically, in the case of the template shown in FIG. 1E, for example, the exposure is controlled at the shutter speed and the diaphragm which are set in S140, the light-receiving surface of the image sensor 66 is then exposed, and the white balance is corrected in accordance with the light source of sunlight. In the case of the template shown in FIG. 1B, for example, a color converting process is conducted so as to set the color tone to sepia. In the case of the template shown in FIG. 1C, for example, a color converting process is conducted so that the color tone is bright.

Next, an image file (user image file) containing the image data indicative of the subject, a file group constituting the selected template, and a file (associating file) which associates the user image file with the template file group are output to the removable memory 20 as shown in FIG. 5 (S170). When image data are to be output to the removable memory 20, the data are compressed at a predetermined compression ratio into a predetermined format. The compression ratio and format of image data may be set on the basis of the imaging control information of the template. In FIG. 5, "001.jpg" is a user image file, and "001.ust" is an associating file. The file name of an associating file is made coincident with that of a corresponding user image file, and, for example, the path of an index file ("Calendar.usm") is described in an associating file as information identifying the selected template. As described above, the path of a layout control file is described in the index file, and the path of a preset image file is described in the layout control file. When the associating file is output together with the user image file to the removable memory 20, therefore, the user image file is associated with the preset image file.

Information which directly associates a user image file with a preset image file may be described in the user image file, and that which directly associates a user image file with a layout control file may be described in the user image file. A file group constituting a template containing a preset image file may not be output to the removable memory 20, and an identifier of the selected template may be output together with a user image file. In this case, as an identifier of a template, a URL, UUID, or the like for identifying a template stored in the server 10 is preferably used. Instead of outputting the substance of a template to the removable memory 20, the identifier of the template may be output, whereby consumption of the storage capacity of the removable memory 20 can be suppressed. When a user image file is to be displayed, a file group constituting a template is downloaded from the server 10 with using the identifier of the template, and a user image can be inserted into a preset image on the basis of the downloaded file group and then displayed.

According to the above-described embodiment of the invention, the imaging conditions of the digital camera 22 are set based on imaging control information described in a layout control file of a template, and hence the user is not required to set all imaging conditions for an imaging a user image suitable to the template. According to the embodiment of the invention, therefore, a user image suitable to a template can be easily taken by the digital camera 22, and then recorded into the removable memory 20.

In the embodiment described above, an example in which a user image to be inserted into a template is taken by a digital camera has been described. Alternatively, a user image may be taken by an imaging apparatus other than a digital camera, such as an image scanner.

What is claimed is:

1. An image processing apparatus comprising:
   an imaging apparatus; and
   a printing apparatus,
   the imaging apparatus comprising:
   an obtaining unit configured to obtain a first file including a first image and imaging information, wherein the first image includes an insertion area,
wherein the imaging information includes a first information for controlling a range-finding area for auto-focusing and a second information for controlling a photometric area for automatic exposure setting;
an imaging unit configured to image a subject to generate a second image, wherein at least part of the second image is inserted into the insertion area;
an imaging controller configured to set an auto-focus area in an imaging range of the imaging unit using the first information and configured to set the photometric area in the imaging range of the imaging unit using the second information, wherein the imaging range corresponds to the insertion area;
a displaying controller configured to synthesize the first image and the second image to generate a first synthesized image and configured to display the first synthesized image;
a generating unit configured to generate a second file including the second image using the imaging information;
a storing unit configured to associate the first file with the second file and configured to store the first file and the second file; and
an outputting unit configured to output the first file and the second file which are associated with each other to the printing apparatus,
the printing apparatus comprising:
a synthesizing unit configured to synthesize the first image in the first file and the second image in the second file to generate a second synthesized image; and
a printing unit configured to print the second synthesized image.

* * * * *